US012603111B2

(12) United States Patent
Radolinski

(10) Patent No.: US 12,603,111 B2
(45) Date of Patent: Apr. 14, 2026

(54) AUDIO GUESTBOOK SYSTEMS AND METHODS

(71) Applicant: Michael H. Radolinski, George Town (KY)

(72) Inventor: Michael H. Radolinski, George Town (KY)

(*) Notice: Subject to any disclaimer, the term of this patent is extended or adjusted under 35 U.S.C. 154(b) by 235 days.

(21) Appl. No.: 18/526,929

(22) Filed: Dec. 1, 2023

(65) Prior Publication Data

US 2025/0182790 A1    Jun. 5, 2025

(51) Int. Cl.
*G11B 20/10*      (2006.01)
*H04M 1/65*      (2006.01)

(52) U.S. Cl.
CPC ..... *G11B 20/10527* (2013.01); *H04M 1/6505* (2013.01); *G11B 2020/10546* (2013.01)

(58) Field of Classification Search
CPC ... G11B 20/10527; G11B 2020/10546; H04M 1/6505
USPC .......................................................... 379/68
See application file for complete search history.

(56) References Cited

U.S. PATENT DOCUMENTS

| | | | |
|---|---|---|---|
| 3,748,402 A | 7/1973 | Yussen | |
| 5,283,818 A | 2/1994 | Klausner et al. | |
| 5,444,767 A * | 8/1995 | Goetcheus ............ | H04M 1/642 |
| | | | 40/124.03 |
| 5,771,276 A | 6/1998 | Wolf | |
| 6,196,893 B1 * | 3/2001 | Casola ..................... | A63H 3/28 |
| | | | 446/297 |

| | | | |
|---|---|---|---|
| 6,253,183 B1 * | 6/2001 | Boucard .............. | B42D 15/022 |
| | | | 40/124.03 |
| 7,032,240 B1 * | 4/2006 | Cronce ................. | H04L 9/0838 |
| | | | 705/51 |
| 7,984,303 B1 * | 7/2011 | Ma ........................ | G11C 16/349 |
| | | | 726/28 |
| 11,611,645 B2 | 3/2023 | Yackley et al. | |
| D982,439 S | 4/2023 | Yackley et al. | |
| 11,642,906 B2 * | 5/2023 | Lien ..................... | B42D 15/022 |
| | | | 704/E11.001 |
| 11,882,230 B2 | 1/2024 | Yackley et al. | |
| 2002/0110224 A1 | 8/2002 | Kovales et al. | |
| 2003/0063716 A1 * | 4/2003 | Turner .................... | H04M 1/21 |
| | | | 379/67.1 |
| 2004/0014456 A1 * | 1/2004 | Vnnen .................... | H04W 4/24 |
| | | | 455/413 |
| 2004/0066915 A1 * | 4/2004 | Turner .................... | H04M 1/21 |
| | | | 379/67.1 |
| 2006/0078105 A1 | 4/2006 | Korn et al. | |

(Continued)

FOREIGN PATENT DOCUMENTS

EP            4418640 A1    8/2024

OTHER PUBLICATIONS

"Fetefone. "FeteFone Audio Guest Book User Guide"" Sep. 11, (Sep. 11, 2023); https://drive.google.com/file/d/1N0DBwJer5Aa_WqZZNhx44pMAdYD9Yudb/view (item #3 of "Non-Patent Literature Documents" in IDS submitted on Jul. 25, 2024) (Year: 2023).*

(Continued)

*Primary Examiner* — Binh Kien Tieu
(74) *Attorney, Agent, or Firm* — Edlavitch Law PLLC

(57)            ABSTRACT

Described herein are improved systems and methods for overcoming technical problems associated with audio guestbooks and voice message recording and playback systems.

20 Claims, 10 Drawing Sheets

AUDIO GUESTBOOK SYSTEM
telephone 100
102 telephone handset with a cord
104 cord
105 telephone line cable
106 audio guestbook hub
108 memory stick
110 power adapter
116

112
power cable (e.g., USB cable)

118
rechargeable battery
or battery pack 114
power source interface

(56) References Cited

U.S. PATENT DOCUMENTS

| | | | |
|---|---|---|---|
| 2010/0185808 A1* | 7/2010 | Yu | G06F 13/1684 |
| | | | 713/193 |
| 2010/0260247 A1 | 10/2010 | Albiston et al. | |
| 2010/0268942 A1* | 10/2010 | Hernandez-Ardieta | |
| | | | H04L 9/3268 |
| | | | 713/156 |
| 2012/0035925 A1 | 2/2012 | Friend et al. | |
| 2013/0287400 A1 | 10/2013 | Hurwitz et al. | |
| 2015/0127946 A1* | 5/2015 | Miller | H04L 9/0897 |
| | | | 713/171 |
| 2016/0004463 A9* | 1/2016 | Deng | G06F 3/0661 |
| | | | 711/E12.008 |
| 2019/0089825 A1* | 3/2019 | Scott | H04M 3/53391 |
| 2020/0110524 A1 | 4/2020 | Lemay et al. | |
| 2020/0168217 A1 | 5/2020 | Webster et al. | |
| 2020/0294558 A1* | 9/2020 | Yu | G11C 11/409 |
| 2022/0086216 A1* | 3/2022 | Zhao | H04L 67/1095 |

| | | |
|---|---|---|
| 2022/0394121 A1 | 12/2022 | Yackley et al. |
| 2023/0254397 A1 | 8/2023 | Yackley et al. |
| 2023/0396702 A1 | 12/2023 | Yackley et al. |

OTHER PUBLICATIONS

Photo Booth Bros. ""Audio Guestbook Instructional Video."" Jul. 10, 2023 (Jul. 10, 2023); https://www.youtube.com/watch?v=UECZ3e9hlc8.

Loeb. ""Architecting personalized delivery of multimedia information."" Communicationsof the ACM 35.12 (1992): 39-47. https://dl.acm.org/doi/10.1145/138859.138862.

FeteFone. ""FeteFone Audio Guest Book User Guide"" Sep. 11, 2023 (Sep. 11, 2023); https://drive.google.com/file/d/1N0DBwJer5Aa_WqZZNhx4plMAdYD9Yydb/view.

The International Search Report for PCT/US2024/013562; mail date Jun. 28, 2024.

The Written Opinion of the International Search Report for PCT/US2024/013562; mail date Jun. 28, 2024.

* cited by examiner

AUDIO GUESTBOOK SYSTEM
100 telephone
102 telephone handset with a cord
104 cord
105 telephone line cable
106 audio guestbook hub
108 memory stick
110 power adapter
116

112
power cable (e.g., USB cable)

118
rechargeable battery
or battery pack 114
power source interface

AUDIO GUESTBOOK SYSTEM
200

AUDIO GUESTBOOK SYSTEM
300

AUDIO GUESTBOOK SYSTEM
400

<u>600</u>

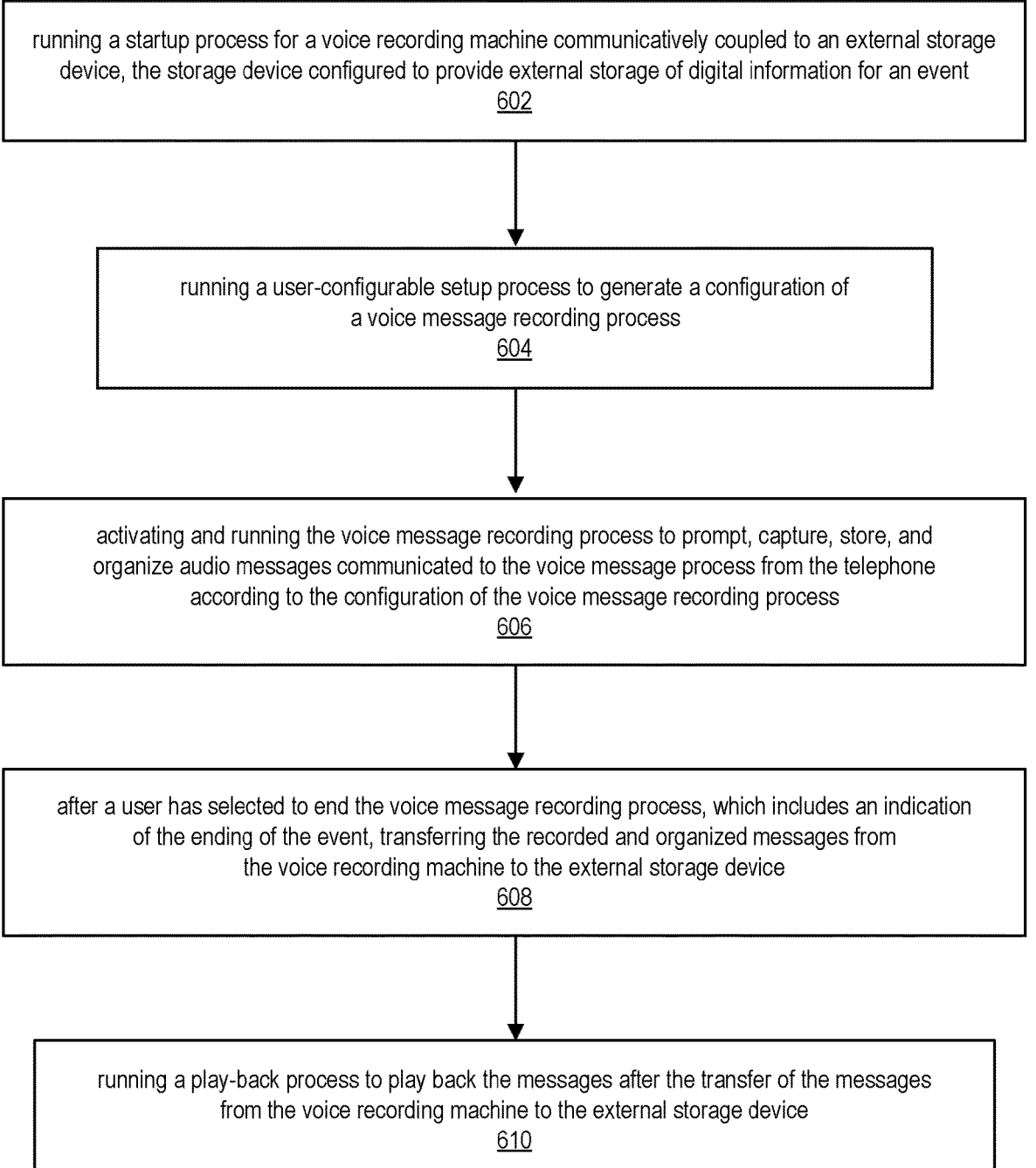

running a startup process for a voice recording machine communicatively coupled to an external storage device, the storage device configured to provide external storage of digital information for an event
<u>602</u> running a user-configurable setup process to generate a configuration of a voice message recording process
<u>604</u> activating and running the voice message recording process to prompt, capture, store, and organize audio messages communicated to the voice message process from the telephone according to the configuration of the voice message recording process
<u>606</u> after a user has selected to end the voice message recording process, which includes an indication of the ending of the event, transferring the recorded and organized messages from the voice recording machine to the external storage device
<u>608</u> running a play-back process to play back the messages after the transfer of the messages from the voice recording machine to the external storage device
<u>610</u>

FIG. 6

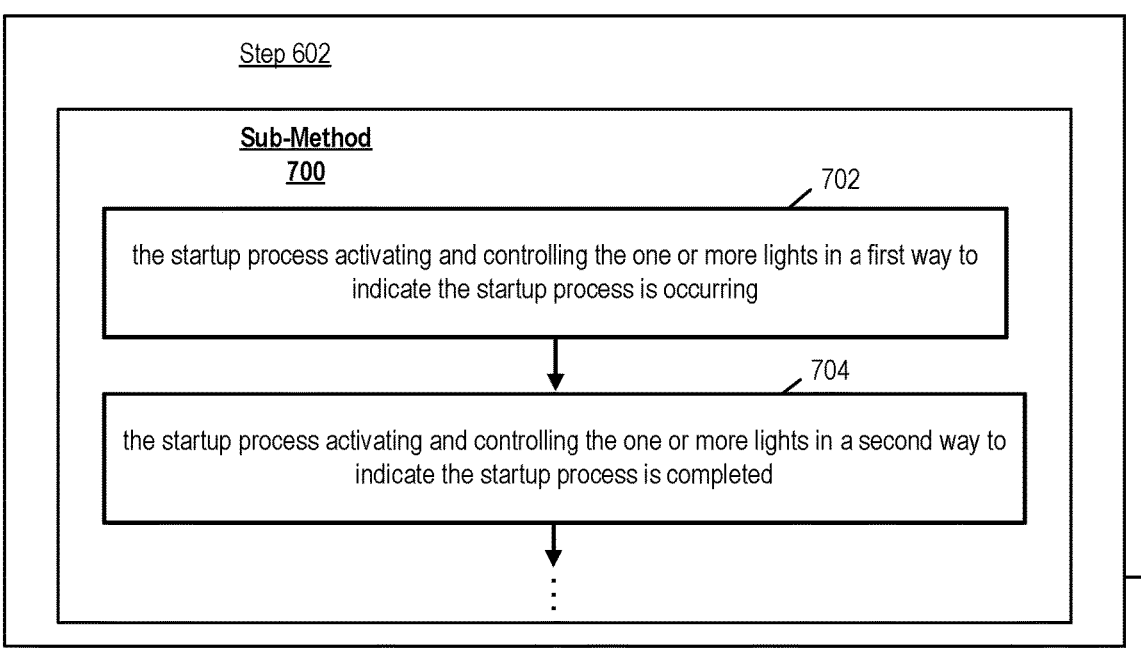
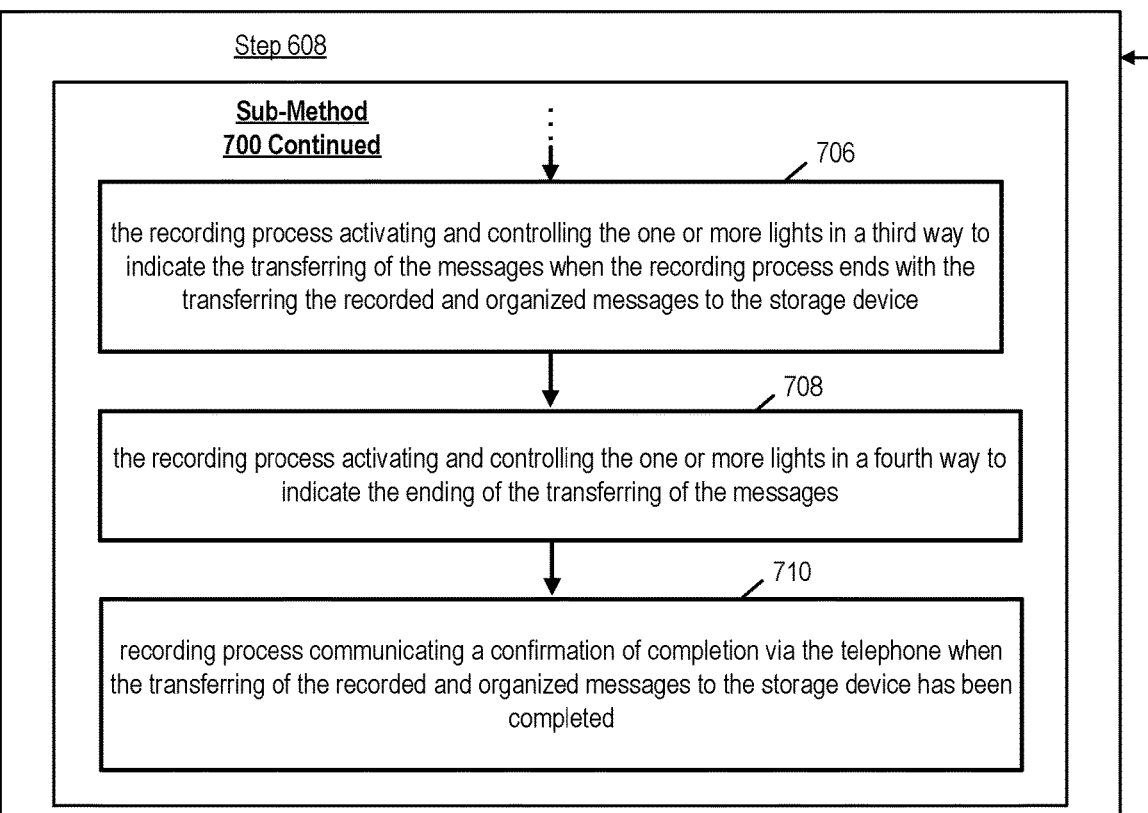
FIG. 7

AUDIO GUESTBOOK SYSTEMS AND METHODS

TECHNICAL FIELD

The present disclosure relates to audio guestbooks as well as voice message recording and playback systems.

BACKGROUND

An audio guestbook system typically includes a voice recording device (such as a voice recording device of a telephone) that records voice messages of guests at an event (such as a wedding, birthday, retirement party, etc.). An audio guestbook is the output of an audio guestbook system and it can include a compilation of audio messages made by guests at the event and recorded by the system. For example, at weddings, it is a trend to record voice messages through a specifically manufactured recording device made to look like a telephone from another era. In some cases, vintage phones are refurbished and modified to include the recording device. After the wedding, the newlyweds then receive the compilation of audio messages as a keepsake. The keepsake can be digitally recorded or analog recordings can be produced on a vinyl record for example.

An example technical problem associated with audio guestbook systems is that they lack modularity and are too specific and arguably too rigid in a pinch. For example, audio guestbook systems often malfunction, and such malfunctions can occur for various reasons that are beyond the skill set of an event coordinator. Often, an entire audio guestbook system needs to be replaced at an event. This can be a significant problem if only one audio guestbook system is brought to the event. One solution is to have a backup system, but that solution seems impractical considering the costs usually associated with audio guestbook systems. Also, the customization of the look and ornamentation of such systems makes it difficult to provide satisfactory backup systems. This is just one of many example problems associated with audio guestbooks.

Also, for example, methodologies used for configuring settings of audio guestbook systems or voice message recording and playback systems seem to be archaic. For example, voice message recording and playback systems have not evolved much since the initial development and use of such systems in the 1970s and 1980s. This lack of enhancements to the configuring of voice messaging is another instance of the many example problems associated with audio guestbooks and voice message recording and playback systems. Thus, it is apparent that there is much room for improvement with such systems and corresponding methodologies, and for overcoming technical problems associated with such systems and corresponding methodologies.

SUMMARY

Described herein are improved systems and methods for overcoming technical problems associated with audio guestbook systems and voice message recording and playback systems. In summary, the systems and methods (or techniques) disclosed herein can provide specific technical solutions to at least overcome the technical problems mentioned in the background section and other parts of the application as well as other technical problems not described herein but recognized by those skilled in the art.

With respect to some embodiments, disclosed herein are methods that can include computerized methods for improving voice message recording and playback systems, in general, and audio guestbook systems, specifically, as well as a non-transitory computer-readable storage medium for carrying out technical operations of the computerized methods. The non-transitory computer-readable storage medium has tangibly stored thereon, or tangibly encoded thereon, computer-readable instructions that when executed by one or more devices (e.g., one or more personal computers or servers) cause at least one processor to perform a method for novel and improved voice message recording and playback, in general, and novel and improved audio guestbook systems, specifically.

For example, some embodiments include a system including a storage device configured to provide storage of digital information for an event. The system also includes a voice recording machine to record messages at the event, and a computing device to perform at least some of the processes associated with the collecting and storing of the recorded messages. The event can include a wedding, a baby shower, an anniversary party, a birthday party, a retirement party, any other type of event for a milestone, or a corporate event, for example.

In some examples, the voice recording machine includes a first electrical connector, configured to couple with an electrical connector of a telephone line cable to communicatively couple a telephone and the voice recording machine with the telephone line cable. The voice recording machine can also include a second electrical connector, configured to couple with a power cable to electrically couple an electrical power source and the voice recording machine with the power cable. The voice recording machine also can include a storage device connector, configured to couple with the storage device to communicatively couple the storage device and the recording machine.

In some embodiments, the voice recording machine includes a wireless communications interface, configured to couple with a wireless communications interface of a telephone to communicatively couple the telephone and the voice recording machine. The voice recording machine can also include an electrical connector, configured to couple with a power cable to electrically couple an electrical power source and the voice recording machine with the power cable.

In some embodiments, the voice recording machine includes a first electrical circuit, configured to integrate the voice recording machine with a telephone. The voice recording machine can also include a second electrical circuit, configured to couple with a power cable to electrically couple an electrical power source and the voice recording machine or the telephone with the power cable. And, the voice recording machine can include a storage device circuit, configured to couple with the storage device to communicatively couple the storage device and the voice recording machine.

In some examples, the computing device includes a processor and a non-transitory computer-readable storage medium including computer program code tangibly stored thereon. In some embodiments, the computer program code includes instructions executable by the processor to run a startup process for the voice recording machine and to run a user-interactive setup process to generate a configuration of a voice message recording process. In some embodiments, the computer program code includes instructions executable by the processor to activate and run the voice message recording process to prompt, capture, store, and organize audio messages communicated to the voice message process from the telephone according to the configuration of the voice message recording process. When the configuration is not generated before the activation and running of the voice message recording process, the computing device will use a default configuration including default settings for the voice message recording process, in some examples. And, in some embodiments, after a user has selected to end the voice message recording process, which includes an indication of the ending of the event, the computer program code includes instructions executable by the processor to transfer the recorded and organized messages from the voice recording machine to the storage device.

These and other important aspects of the invention are described more fully in the detailed description below. The invention is not limited to the particular methods and systems described herein. Other embodiments can be used and changes to the described embodiments can be made without departing from the scope of the claims that follow the detailed description. Within the scope of this application, it should be understood that the various aspects, embodiments, examples, and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

The present disclosure will be understood more fully from the detailed description given below and from the accompanying drawings of various example embodiments of the disclosure.

FIGS. 6 to 11 illustrate example operations of audio guestbook systems, specifically, and voice message recording and playback systems, in general, in accordance with some embodiments of the present disclosure.

DETAILED DESCRIPTION

Details of example embodiments of the invention are described in the following detailed description with reference to the drawings. Although the detailed description provides reference to example embodiments, it is to be understood that the invention disclosed herein is not limited to such example embodiments. But to the contrary, the invention disclosed herein includes numerous alternatives, modifications, and equivalents as will become apparent from consideration of the following detailed description and other parts of this disclosure.

Described herein are improved systems and methods for overcoming technical problems associated with voice message recording and playback systems in general, and specifically associated with audio guestbook systems.

Figure 1:
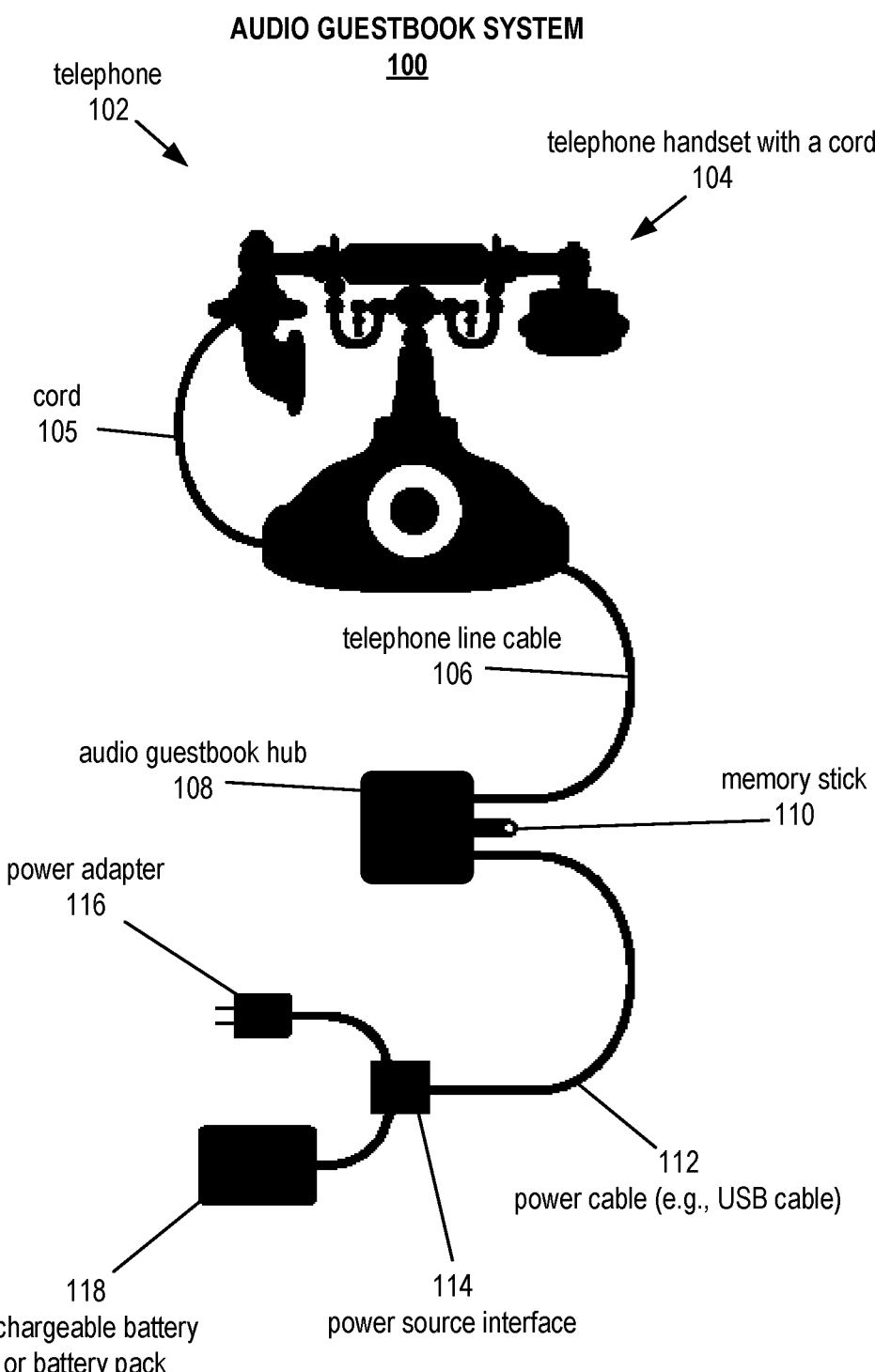
FIG. 1 illustrates an audio guestbook system using a telephone and a telephone line cable to communicate messages from the telephone to an audio guestbook hub, in accordance with some embodiments of the present disclosure.

FIG. 1 illustrates an audio guestbook system 100 using telephone 102 that has a telephone handset 104 with a microphone and a cord 105 and a telephone line cable 106 to communicate messages to an audio guestbook hub 108, in accordance with some embodiments of the present disclosure. In some embodiments of the audio guestbook system 100, the telephone handset 104 does not include a cord because it is cordless and the cord has been replaced by a short-range wireless communications link and corresponding hardware (such as a link configured to accommodate handsets of cordless phones and corresponding hardware). In some embodiments of the audio guestbook system 100, the telephone line cable 106 does not exist because it has been replaced by a short-range wireless communications link and corresponding hardware (such as a Bluetooth link or a Wi-Fi link and corresponding hardware).

In some embodiments, the telephone 102 is configured for analog communications or an analog telephone line. In some embodiments, the telephone 102 is configured for digital communications or a digital telephone line. In some examples, the telephone line cable 106 is configured to communicate analog messages, including examples wherein the telephone 102 is configured for analog communications or an analog telephone line. In some examples, the telephone line cable 106 is configured to communicate digital messages, including examples wherein the telephone 102 is configured for digital communications or a digital telephone line. Also, the audio guestbook hub 108 can include one or more communications interfaces configured to communicatively couple the hub and a telephone with an analog telephone line, a digital telephone line, or both, depending on the embodiment.

One of the benefits of the audio guestbook system 100 as well as some other embodiments described herein is that a diverse collection of telephone styles can be tailored to suit the unique aesthetic of a customer. As shown in FIG. 1, the telephone 102 is a retro phone having the ornamentation of a phone from years past. The telephone in this example as well as other examples can be a retro phone from a similar age or another period. Also, the telephone 102 can be a novelty phone, such as a phone that looks like a pair of lips or a hamburger, for example. Also, the systems described herein allow for the personalization of the guest experience by recording an optional outgoing greeting that can be heard before a guest leaves a message. Also, the telephone 102 or another example of the phone in the systems described herein can include an accompanying sign or frame of a sign that can be customized. The customization can be according to a template, or not, to match a style of an event, for example.

Furthermore, the voicemail guestbook can be placed just about anywhere at an event because it can either plug into a standard power outlet or use a battery or battery pack. Also, in some examples, such as the embodiments shown in FIGS. 1 and 2, no Wi-Fi, Internet connection, phone line, or cell service is required to use the full functionality of the system.

And, with no practical limit on recording time in some embodiments, guests can fully express their feelings. From a cocktail hour to a reception, rehearsal dinner to a send-off brunch, for example, the systems described herein can travel with the admin user or event coordinator throughout an event to ensure memories are captured without location restrictions.

The system in general can include a voice recording machine or an audio recording machine, e.g., see audio guestbook hub 108 which can include a voice recording machine. For this disclosure, it is to be understood that a reference to an audio recording machine or just a recording machine is a reference to a voice recording machine in that these terms are to be considered synonymous. The voice recording machine or audio guestbook hub 108, specifically, can include a first electrical connector, configured to couple with an electrical connector of a telephone line cable (e.g., see telephone line cable 106) to communicatively couple a telephone (e.g., see telephone 102) and the voice recording machine (e.g., see hub 108) with the telephone line cable.

In some embodiments, a system can include a storage device (such as an external storage device) configured to provide storage of digital information for an event (such as a wedding, a baby shower, an anniversary party, a birthday party, a retirement party, a corporate event, etc.) as well a corresponding interface to connect the storage device to a digital audio recording device. FIG. 1, for example, illustrates a memory stick 110 inserted into a memory stick interface of the audio guestbook hub 108. The corresponding interface is not specifically depicted. However, a recording machine of the system, or audio guestbook hub 108, specifically, can include a storage device connector, configured to couple with the storage device (e.g., see memory stick 110) to communicatively couple the storage device and the voice recording machine.

Also, the system can include a power cable (e.g., see power cable 112) and a corresponding interface for its audio recording device or audio guestbook hub. As shown in FIG. 1, in addition to the memory stick interface, the audio guestbook hub 108 includes a power source interface 114 that is configured to receive electrical power via power cable 112 that interfaces power sources or power adapters. As shown, the power source interface 114 couples electrically with the power adapter 116 (e.g., an AC to DC power adapter) or the rechargeable battery 118 (which can be a rechargeable battery pack in some embodiments). In other words, an audio recording machine, or audio guestbook hub 108, for example, can also include a second electrical connector, configured to couple with a power cable (e.g., see power cable 112—which can be a USB cable) to electrically couple an electrical power source (e.g., see power adapter 116 and rechargeable battery 118) and the voice recording machine with the power cable.

Figure 5:
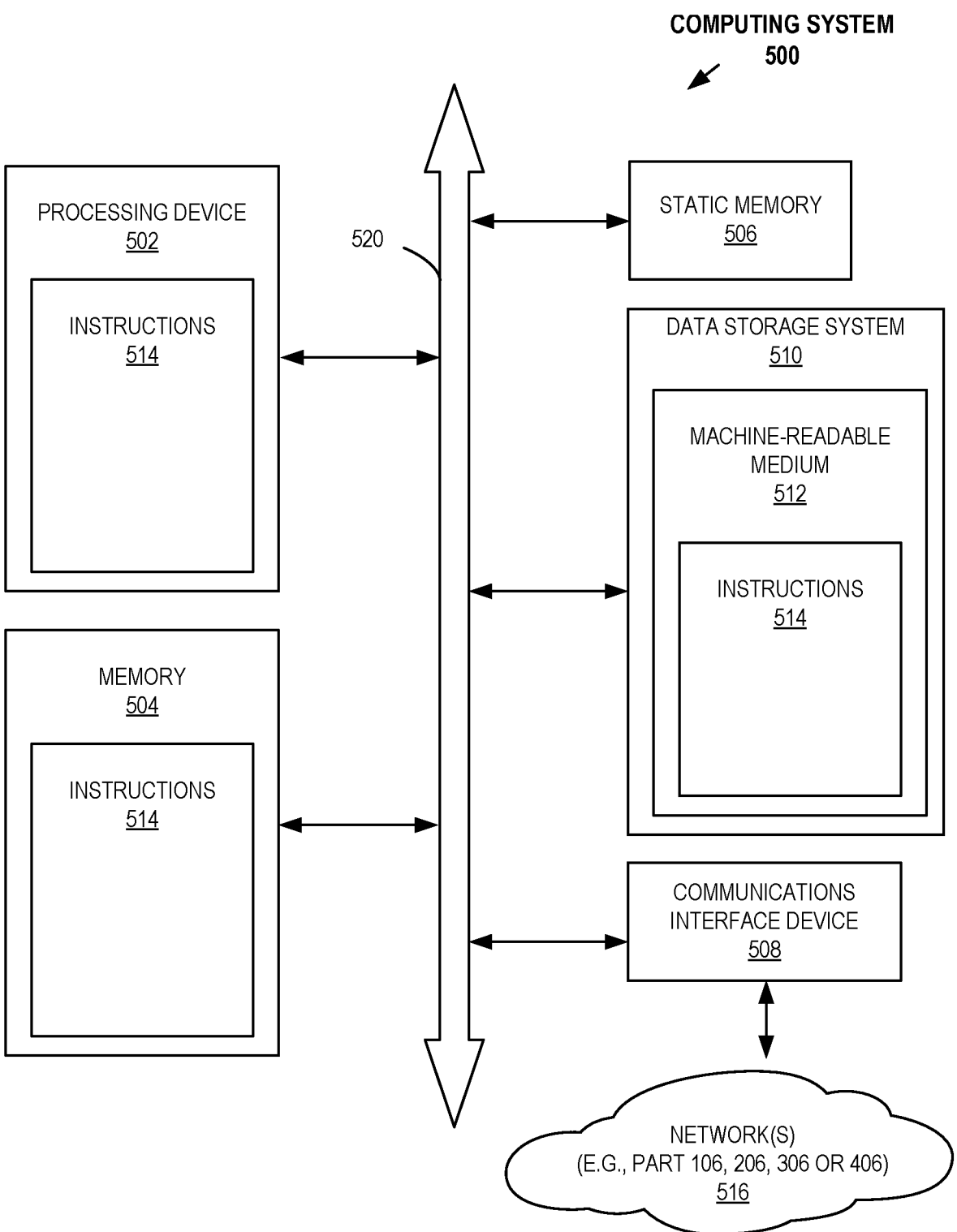
FIG. 5 illustrates example aspects of an example computing system, in accordance with some embodiments of the present disclosure.

Also, the audio recording machine or audio guestbook hub 108, specifically, can include a computing device (e.g., see computing system 500 shown in FIG. 5). The computing device can include a processor and a non-transitory computer-readable storage medium including computer program code tangibly stored thereon, the computer program code including instructions executable by the processor to run a startup process for the voice recording machine (e.g., see step 602 of method 600 shown in FIG. 6). The instructions are also executable by the processor to run a user-interactive setup process to generate a configuration of a voice message recording process (e.g., see step 604 of method 600).

The guest or host interactions with the audio guestbook hub can be unique in that if a customer fails to configure the hub in advance, the guest at the event is prompted to skip the user-interactive setup process to enter a message capture mode using a default group of settings. To put it another way, the instructions are also executable by the processor to activate and run the voice message recording process to prompt, capture, store, and organize audio messages communicated to the voice message process from the telephone according to the configuration of the voice message recording process (e.g., see step 606 of method 600), and when the configuration is not generated before the activation and running of the voice message recording process, the computing device will use a default configuration including default settings for the voice message recording process.

The instructions are also executable by the processor to transfer the recorded and organized messages from the voice recording machine to the storage device after a user has selected to end the voice message recording process—which includes an indication of the ending of the event. E.g., see step 608 of method 600. The instructions are also executable by the processor to run a play-back process to play back the messages after the transfer of the messages from the voice recording machine to the storage device (e.g., see step 610 of method 600). In some examples, the running of the play-back process to play back the messages occurs only after the transfer of the messages from the voice recording machine to the storage device.

As shown in FIG. 1, for example, the audio guestbook hub 108 is separate from the telephone 102. The audio guestbook hub being separate from the phone is beneficial in that it improves the modularity of the respective audio guestbook system. It allows the recording machine to be used with any analog phone or digital phone, rather than a custom-manufactured phone including an audio recording device. Contrary to the system in FIG. 1, the system in FIG. 2, for example, includes a telephone 202 that has an audio guestbook hub 208 integrated into the phone in that it is not separate from the phone such as the audio guestbook hub 108. The systems of FIGS. 3 and 4 also provide similar modularity but through different types of implementations.

Figure 2:
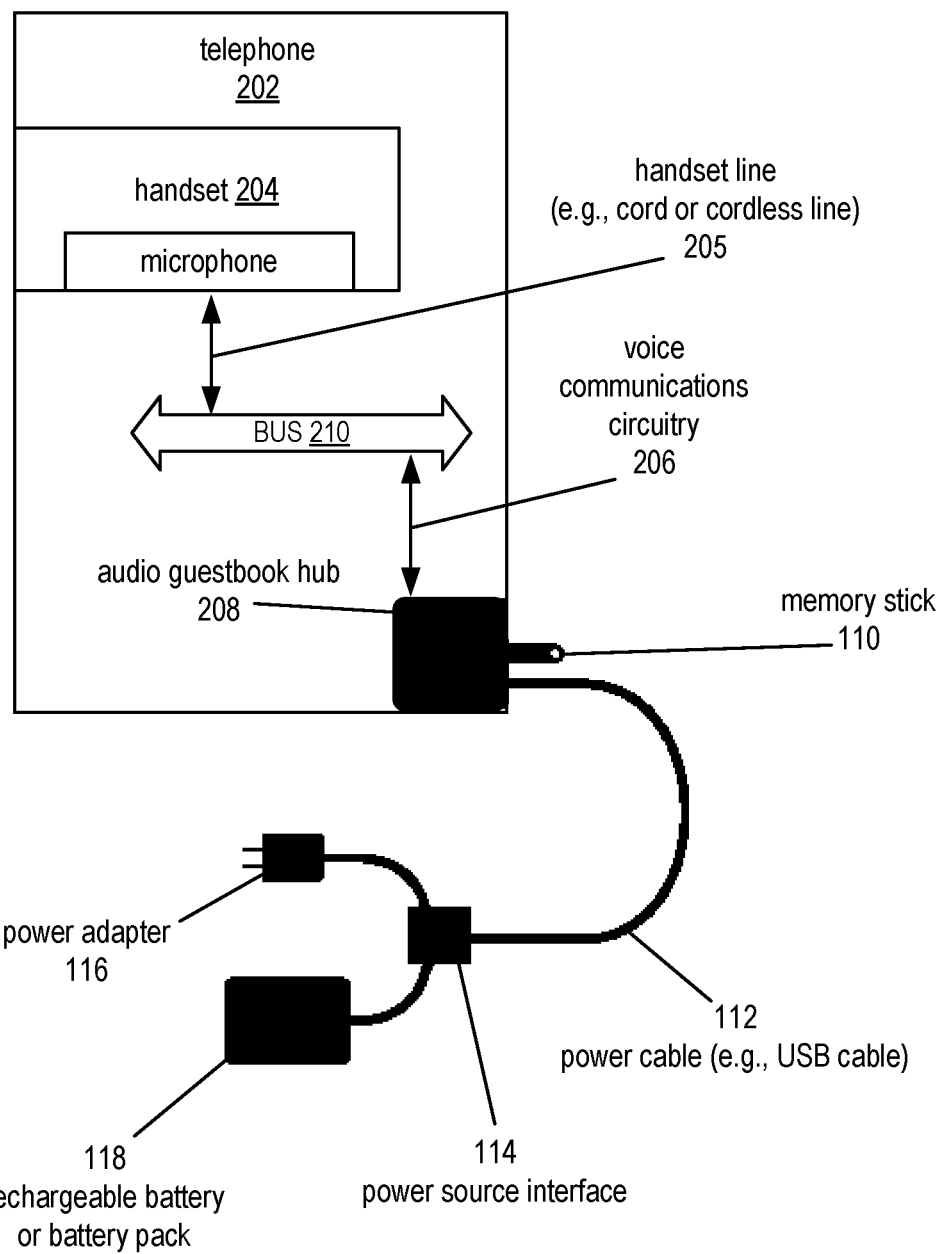
FIG. 2 illustrates an audio guestbook system using a telephone and an audio guestbook hub integrated into the telephone, in accordance with some embodiments of the present disclosure.

Like the system shown in FIG. 2, in some embodiments, the system can include a storage device configured to provide storage of digital information for an event as well as a voice recording machine that includes a first electrical circuit, configured to integrate the voice recording machine with a telephone. Also, the voice recording machine can include a second electrical circuit, configured to couple with a power cable to electrically couple an electrical power source and the voice recording machine or the telephone with the power cable. The voice recording machine can also include a storage device circuit, configured to couple with the storage device to communicatively couple the storage device and the voice recording machine. Also, the voice recording machine can include a computing device, including a processor and a non-transitory computer-readable storage medium including computer program code tangibly stored thereon.

Figure 3:
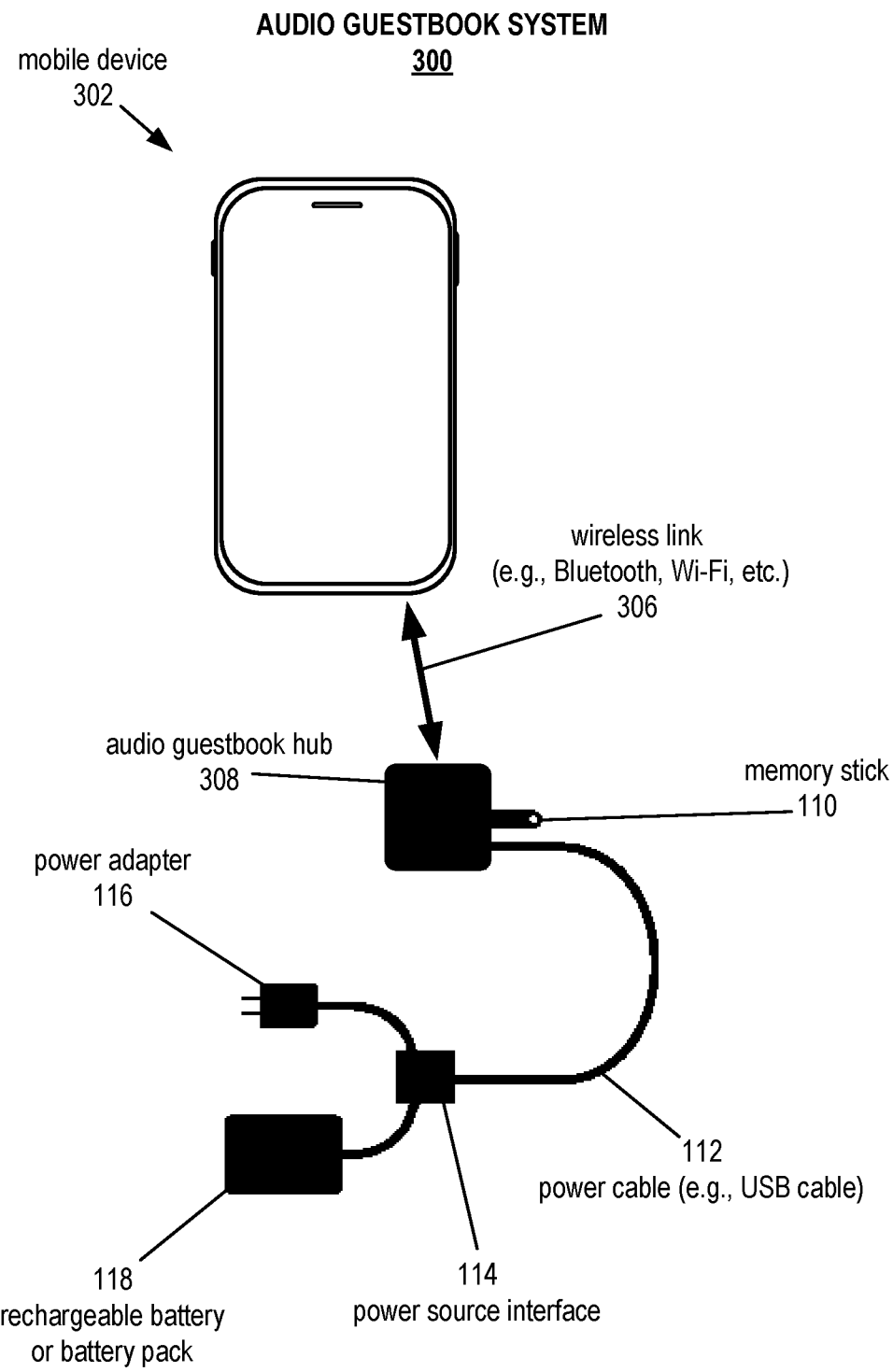
FIG. 3 illustrates an audio guestbook system using a mobile device (such as a smartphone) and a wireless link (such as a Bluetooth link or a Wi-Fi link) to communicate messages to an audio guestbook hub, in accordance with some embodiments of the present disclosure.
Figure 4:
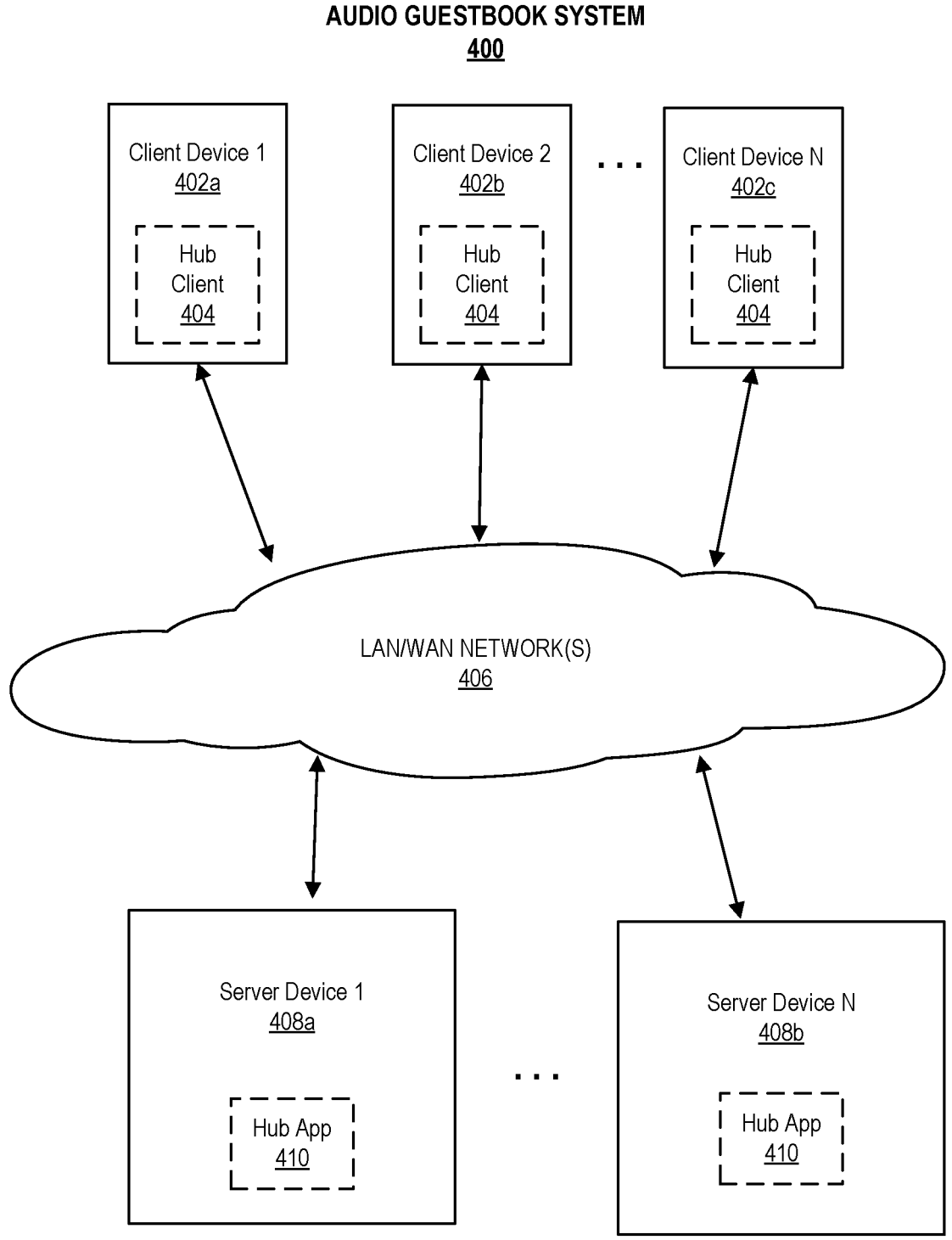
FIG. 4 illustrates an example network of computing systems to implement technologies for an audio guestbook system, in accordance with some embodiments of the present disclosure.

The computer program code (whether the code is for the audio guestbook hub 108, the audio guestbook hub 208, the audio guestbook hub 308 shown in FIG. 3, or the audio guestbook hub client 404 or audio guestbook hub application 410 shown in FIG. 4, or an analogous device, apparatus, or system not depicted herein) includes instructions executable by the processor to run a startup process for the voice recording machine as well as run a user-interactive setup process to generate a configuration of a voice message recording process. The computer program code also includes instructions executable by the processor to activate and run the voice message recording process to prompt, capture, store, and organize audio messages communicated to the voice message process from the telephone according to the configuration of the voice message recording process. In some examples, when the configuration is not generated before the activation and running of the voice message recording process, the computing device will use a default configuration including default settings for the voice message recording process. Also, the computer program code includes instructions executable by the processor to transfer the recorded and organized messages from the voice recording machine to the storage device after a user has selected to end the voice message recording process (which includes an indication of the ending of the event). In some examples, the system allows for the administrator or main user to configure the device through the user-interactive setup process; however, in some of such examples, if the user skips the process, the system can still provide the activation and running of the voice message recording process to prompt, capture, store, and organize audio messages communicated to the voice message process from the telephone.

FIG. 2 illustrates an audio guestbook system 200 using a telephone 202 that has a handset 204 that includes a microphone and a handset line 205 to communicate messages, and via voice communications circuitry 206, to an audio guestbook hub 208, in accordance with some embodiments of the present disclosure. Similar to the audio guestbook system 100, the handset line 205 can include a cord or be cordless. Also shown is a bus 210, in which the bus communicatively couples the handset line 205 and the voice communications circuitry 206 and thus communicatively couples the microphone of the handset 204 with the audio guestbook hub 208 so that the hub can record audio input transduced from the microphone of the handset. Also, as shown, the hub 208 is integrated with the telephone 202.

Also, FIG. 2 illustrates a memory stick 110 inserted into a memory stick interface of the audio guestbook hub 208. The audio guestbook hub 208 receives electrical power via power cable 112 that interfaces power sources or power adapters through a power source interface 114. As shown, the power source interface 114 couples electrically with the power adapter 116 (e.g., an AC to DC power adapter) or the rechargeable battery 118 (which can be a rechargeable battery pack in some embodiments). In some examples of the audio guestbook system 200, the bus 210 directly provides an interface or connection for the power cable 112 instead of the audio guestbook hub 208 providing such an interface or connection. In such examples, power for the audio guestbook hub 208 is received via the bus 210. With the audio guestbook system 200, or any other system described herein, the telephone part of the system can be powered by a direct power source independently or via the audio guestbook hub.

The features of the audio guestbook system 200 are similar to those of the audio guestbook system 100; however, the local link between the telephone and the audio guestbook hub in the audio guestbook system 200 is integrated into the telephone 202 instead of being dependent on a cord as in the audio guestbook system 100 (see voice communications circuitry 206 and bus 210). The audio guestbook hub 208 is therefore modified to differ from audio guestbook hub 108 accordingly. Similarly, the audio guestbook system 200 includes a storage device configured to provide storage of digital information for an event and a voice recording machine.

FIG. 3 illustrates an audio guestbook system 300 using a mobile device 302 (such as a smartphone or smartwatch)

and a wireless link 306 (such as Bluetooth or Wi-Fi link) to communicate messages to an audio guestbook hub 308, in accordance with some embodiments of the present disclosure. Also, FIG. 3 illustrates a memory stick 110 inserted into a memory stick interface of the audio guestbook hub 108. The audio guestbook hub 108 receives electrical power via power cable 112 that interfaces power sources or power adapters through a power source interface 114. As shown, the power source interface 114 couples electrically with the power adapter 116 (e.g., an AC to DC power adapter) or the rechargeable battery 118 (which can be a rechargeable battery pack in some embodiments).

The features of the audio guestbook system 300 are similar to those of the audio guestbook systems 100 and 200; however, the local link between the telephone and the audio guestbook hub 308 in the audio guestbook system 300 is wireless (see wireless link 306). The audio guestbook hub 308 is therefore modified to differ from audio guestbook hub 108 accordingly. For instance, the audio guestbook hub 308 includes a wireless interface to make a connection with the phone of its system. Similarly, the audio guestbook system 300 includes a storage device configured to provide storage of digital information for an event and a voice recording machine. However, the recording machine or audio guestbook hub 308, specifically, includes a wireless communications interface, configured to couple with a wireless communications interface of a telephone (e.g., see mobile device 302) to communicatively couple the telephone and the voice recording machine (e.g., see wireless link 306, which can be a Bluetooth or Wi-Fi link for example). Also, the recording machine or audio guestbook hub 308, specifically, includes an electrical connector, configured to couple with a power cable (e.g., see power cable 112—which can be a USB cable) to electrically couple an electrical power source (e.g., see power adapter 116 or rechargeable battery 118) and the voice recording machine with the power cable. The recording machine or audio guestbook hub 308, specifically, also includes a storage device connector, configured to couple with the storage device to communicatively couple the storage device and the voice recording machine. And, the recording machine or audio guestbook hub 308, specifically, includes a computing device similar to the computing device of the machine or audio guestbook hub 108 in that it includes a processor and a non-transitory computer-readable storage medium including computer program code tangibly stored thereon, the computer program code including instructions executable by the processor to execute similar functionality to the instructions of the audio guestbook hub 108 (e.g., see method steps of FIG. 6).

FIG. 4 illustrates an example network of computing systems to implement technologies for an audio guestbook system 400, in accordance with some embodiments of the present disclosure. The network of computing systems of the audio guestbook system 400 can implement any of the aforesaid components and operations as well as any component or operation described herein. The network of computing systems is shown including client devices or end-user devices (e.g., see client devices 402a, 402b, and 402c) that host a client-side application for the audio guestbook system 400 (e.g., see audio guestbook hub client 404). The audio guestbook hub client 404 shown in FIG. 4 can provide client-side application features such as user-interface elements and user-interaction aspects of any of the methodologies described herein.

The network of computing systems is also shown including server devices (e.g., see server devices 408a and 408b) that host a server-side application for the audio guestbook system 400 (e.g., see audio guestbook hub application 410). The audio guestbook hub application 410 shown in FIG. 4 can provide server-side application features such as the distribution and management of various aspects of the audio guestbook hub client 404 and transactional, record keeping, and storage aspects of any of the methodologies described herein or any aspects of any of the methodologies typically associated with back-end or server-side computer processes. The client devices can send and receive data to and from the server devices, and vice versa via the LAN/WAN network(s) 406. Also, the client devices can communicate amongst themselves via the LAN/WAN network(s) 406. And, the server devices can communicate amongst themselves via the one or more LAN/WAN networks 406.

The network of computing systems is also shown including the LAN/WAN network(s) 406 which are shown communicatively coupling the computing devices of the audio guestbook system 400. The LAN/WAN network(s) 406 can include one or more local area networks (LAN(s)) and/or one or more wide area networks (WAN(s)). The LAN/WAN network(s) 406 can include the Internet and/or any other type of interconnected communications network. The LAN/WAN network(s) 406 can also include a single computer network or a telecommunications network. More specifically, the LAN/WAN network(s) 406 can include a local area network (LAN) such as a private computer network that connects computers in small physical areas, a wide area network (WAN) to connect computers located in different geographical locations, and/or a metropolitan area network (MAN)—also known as a middle area network—to connect computers in a geographic area larger than that covered by a large LAN but smaller than the area covered by a WAN.

At least each shown component of the network of computing systems of the audio guestbook system 400 can be or include a computing system that can include memory that can include media. The media can include or be volatile memory components, non-volatile memory components, or a combination of such. In general, each of the computing systems can include a host system that uses the memory. For example, the host system can write data to the memory and read data from the memory. The host system can be a computing device such as a desktop computer, laptop computer, network server, mobile device, or such computing device that includes a memory and a processing device. The host system can include or be coupled to the memory so that the host system can read data from or write data to the memory. The host system can be coupled to the memory via a physical host interface. The physical host interface can provide an interface for passing control, address, data, and other signals between the memory and the host system.

One example benefit of the audio guestbook system 400 is that it can leverage a cell- and/or Wi-Fi network to provide immediate message retrieval. Also, in some embodiments of the audio guestbook system 400 and other examples, the client part of the application can provide message delivery without recording, random message playback, etc. Such examples can be beneficial for company or organization events such as a retirement party.

FIG. 5 illustrates example aspects of an example computing system 500, in accordance with some embodiments of the present disclosure. FIG. 5 illustrates parts of the computing system 500 within which a set of instructions, for causing the machine to perform any one or more of the methodologies discussed herein, can be executed. In some embodiments, the computing system 500 can correspond to a host system that includes, is coupled to, or utilizes memory or can be used to perform the operations of a controller (e.g., to execute an operating system to perform operations corresponding to the audio guestbook hub 108, the audio guestbook hub 208, the audio guestbook hub 308, the audio guestbook hub client 404, and the audio guestbook hub application 410 as well as corresponding computing systems thereof). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computing system 500 includes a processing device 502, a main memory 504 (e.g., read-only memory (ROM), flash memory, dynamic random-access memory (DRAM), etc.), a static memory 1206 (e.g., flash memory, static random-access memory (SRAM), etc.), and a data storage system 510, which communicate with each other via a bus 520.

The processing device 502 represents one or more general-purpose processing devices such as a microprocessor, a central processing unit, or the like. More particularly, the processing device can be a microprocessor or a processor implementing other instruction sets, or processors implementing a combination of instruction sets. The processing device 502 can also be one or more special-purpose processing devices such as an application-specific integrated circuit (ASIC), a field programmable gate array (FPGA), a digital signal processor (DSP), a network processor, or the like. The processing device 502 is configured to execute instructions 514 for performing the operations discussed herein. The computing system 500 can further include a communications interface device 508 to communicate over one or more LAN/WAN networks and links 516 such as the telephone line cable 106 of the audio guestbook system 100, the voice communications circuitry 206 of the audio guestbook system 200, the wireless link 306 of the audio guestbook system 300, and the LAN/WAN network(s) 406 of the audio guestbook system 400.

The data storage system 510 can include a machine-readable storage medium 512 (also known as a computer-readable medium) on which is stored one or more sets of instructions 514 or software embodying any one or more of the methodologies or functions described herein. The instructions 514 can also reside, completely or at least partially, within the main memory 504 and/or within the processing device 502 during execution thereof by the computing system 500, the main memory 504 and the processing device 502 also constituting machine-readable storage media.

In one embodiment, the instructions 514 include instructions to implement functionality corresponding to the audio guestbook hub 108, the audio guestbook hub 208, the audio guestbook hub 308, the audio guestbook hub client 404, and the audio guestbook hub application 410 as well as corresponding computing systems thereof. While the machine-readable storage medium 512 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that causes the machine to perform any one or more of the methodologies of the present disclosure. The term "machine-readable storage medium" shall accordingly be taken to include, but not be limited to, solid-state memories, optical media, and magnetic media.

With respect to the audio guestbook systems illustrated in FIGS. 1 to 4 as well as the computing system 500 that can be used by all of such systems, it should be understood that some embodiments of such systems include instructions (such as instructions 514) that when executed by a processor can perform the steps of method 600 shown in FIG. 6 as well as the sub-steps of the steps of method 600 shown in FIGS. 7 to 11.

With respect to some of the embodiments of the systems and/or methods described herein, the systems can include an AC power adapter and the electrical power source includes the AC power adapter (e.g., see power adapter 116 which can be an AC power adapter in some examples). In some embodiments, the system can include a rechargeable battery pack and the electrical power source includes the rechargeable battery pack (e.g., see rechargeable battery 118 which can be a rechargeable battery pack or one or more rechargeable batteries depending on the embodiment).

In some embodiments, the cables are a part of the system. In some embodiments, the links (whether wireless or not) are part of the system. For instance, in some examples, the system includes the telephone and the telephone line cable. Also, the system can include a power cable such as a USB cable.

In some embodiments, the storage device includes an external storage device that includes a memory card or stick configured to store the digital information, and the memory card or stick includes an electronic non-volatile computer memory storage medium that is electrically erasable and reprogrammable. In some cases, the electronic non-volatile computer memory storage medium includes flash memory. In some embodiments, the storage device includes an external storage device that includes a USB flash drive, configured to store digital information. The USB flash drive includes flash memory and a USB interface integrated with the flash memory. Also, in some examples, the systems herein can provide an option to copy a pre-recorded greeting from a memory stick for the configuration of the recording device (such as for the greeting configured in step 604 and used in step 606).

In some embodiments, the voice recording machine further includes one or more lights on the voice recording machine. In some cases, the startup process activates and controls the one or more lights in a first way to indicate the startup process is occurring. In some cases, the startup process activates and controls the one or more lights in a second way to indicate the startup process is completed. And, in some instances, when the recording process ends with the transferring of the recorded and organized messages to the storage device, the recording process activates and controls the one or more lights in a third way to indicate the transferring of the messages.

In some embodiments, the user-interactive setup process provides a user with an option to select customizing settings of the voice message recording process or select the default settings for the voice message recording process. In some examples, the computing system can prompt the customer to record their message or play it back to them, for example, or offer a default greeting. Also, the computing system can provide an option to copy a pre-recorded greeting from an attached USB stick. Also, guest and host interactions can be unique with the system since when a customer fails to configure their audio guestbook hub in advance, the guest at the event is prompted to skip the user-interactive setup process to enter capture mode. Also, the system in some examples can take the customer through modes of operation on a seamless schedule (such as the routine provided in method 600). The software of the system can also guide the customer through language selection, recording a greeting, setting call tones or capture mode for messages, and playing back greetings or messages. Also, the software can include a selection interface for dial tones and ringing tones for different geographies, countries, and locations. Also, the software can include selection and custom configuration of various modes of operation including and beyond language selection, recording a greeting, setting call tones, capture mode, and user-selectable options or procedures for then playing back messages.

In some embodiments, the user-interactive setup process provides a user with an option to select a language for the voice message recording process prior to providing the option to select customizing settings or select the default settings. In some cases, the user-interactive setup process includes receiving user input for the setup process via a user interface of the telephone. And, in some examples, the user input is communicated to the computing device of the voice recording machine with the telephone line cable or wirelessly depending on the embodiment of the system.

In some embodiments, when a user completes a message by hanging up the telephone, the recording process is configured to automatically store and organize the message without further input from the user. In some cases, the automatic storing and organizing is caused by an ending of an electrical signal transmitted from the telephone corresponding to the message.

In some embodiments, when an electrical signal is transmitted from the telephone corresponding to the message over a preselected threshold amount of time, the recording process is configured to automatically terminate the message and store and organize the message without further input from the user. In some cases, the preselected threshold is a first threshold amount of time. And, in some instances, when an electrical signal is transmitted from the telephone corresponding to the message and the message in the signal is silent over a second preselected threshold amount of time, the recording process is configured to automatically terminate the message and store and organize the message without further input from the user. In some cases, the first and second thresholds are different amounts of time.

In some embodiments, when an electrical signal is transmitted from the telephone corresponding to the message and the message in the signal is silent over a pre-selected threshold amount of time, the recording process is configured to automatically terminate the message and store and organize the message without further input from the user.

In some embodiments, the recording process includes communicating a confirmation of completion via the telephone when the transferring of the recorded and organized messages to the storage device has been completed.

In some embodiments, the storage device is not reusable for storing additional messages after the transfer of the messages unless a license key is entered at the commencement of a reuse process, and the computer program code includes further instructions executable by the processor to play back the messages and communicate the played-back messages via the telephone after the transfer of the messages. In some cases, the ability to add other recordings to the USB stick and have them play back through the phone afterward is an important benefit of a system. The device can also convert greeting or additional audio files between formats (e.g. mp3 to a-law formats or vice versa) to play them back through the phone.

In some embodiments, the computer program code includes further instructions executable by the processor to playback the messages and communicate the played-back messages via the telephone. And, in some cases, wherein the playback of the messages occurs in the order they were recorded, in a randomized order, or an order derived from the contents of the messages depending on the order selected by a user. The ability to play messages back in either sequential or random order is unique in such systems. The device can also convert greeting or additional audio files between formats (e.g. from format mp3 to a-law) to play them back through the phone.

FIGS. 6 to 11 illustrate example operations of audio guestbook systems, specifically, and voice message recording and playback systems, in general, in accordance with some embodiments of the present disclosure. FIGS. 6 to 11 illustrate method 600, method 700 (which is a sub-method of steps 602 and 608 of method 600), method 800 (which is a sub-method of step 604), method 900 (which is a sub-method of step 606), method 1000 (which is also a sub-method of step 606), and method 1100 (which is a sub-method of step 610).

The method 600 is a computer-implemented method and, at step 602, commences with running a startup process for a voice recording machine communicatively coupled to a storage device (such as an external storage device). In some cases, the storage device is configured to provide storage for digital information associated with an event. In some embodiments, including the systems and methods described herein, the storage device includes an external storage device that includes or is a part of a memory card or stick configured to store the digital information. In some examples, the memory card or stick includes an electronic non-volatile computer memory storage medium that is electrically erasable and reprogrammable. In some examples, the electronic non-volatile computer memory storage medium includes flash memory. In some examples, the storage device includes an external storage device that includes a USB flash drive, configured to store digital information. The storage device can include flash memory and a USB interface integrated with the flash memory.

At step 604, the method 600 continues with running a user-interactive setup process to generate a configuration of a voice message recording process.

At step 606, the method 600 continues with activating and running the voice message recording process to prompt, capture, store, and organize audio messages communicated to the voice message process from the telephone according to the configuration of the voice message recording process. In some examples, when the configuration is not generated before the activation and running of the voice message recording process, the method 600 includes using a default configuration including default settings for the voice message recording process at 606.

At step 608, the method 600 continues with transferring the recorded and organized messages from the voice recording machine to the storage device after a user has selected to end the voice message recording process, which includes an indication of the ending of the event. At step 610, the method 600 continues with running a play-back process to play back the messages after the transfer of the messages from the voice recording machine to the storage device. In some embodiments, the method 600 continues with running a play-back process to play back the messages only after the transfer of the messages from the voice recording machine to the storage device.

In some embodiments, the voice recording machine further includes one or more lights on the voice recording machine, such as illustrated by the method depicted in FIG. 7. The method 700 is a computer-implemented sub-method of steps 602 and 608 of method 600 and, at step 702, commences with the startup process activating and controlling the one or more lights in a first way to indicate the startup process is occurring. At step 704, the method 700 continues with the startup process activating and controlling the one or more lights in a second way to indicate the startup process is completed. At step 706, the method 700 continues with the recording process activating and controlling the one or more lights in a third way to indicate the transferring of the messages when the recording process ends with the transferring of the recorded and organized messages to the storage device. At step 708, the method 700 continues with the recording process activating and controlling the one or more lights in a fourth way to indicate the ending of the transferring of the messages. Also, at step 710, the method 700 continues with the recording process communicating a confirmation of completion via the telephone when the transferring of the recorded and organized messages to the storage device has been completed.

Figure 8:
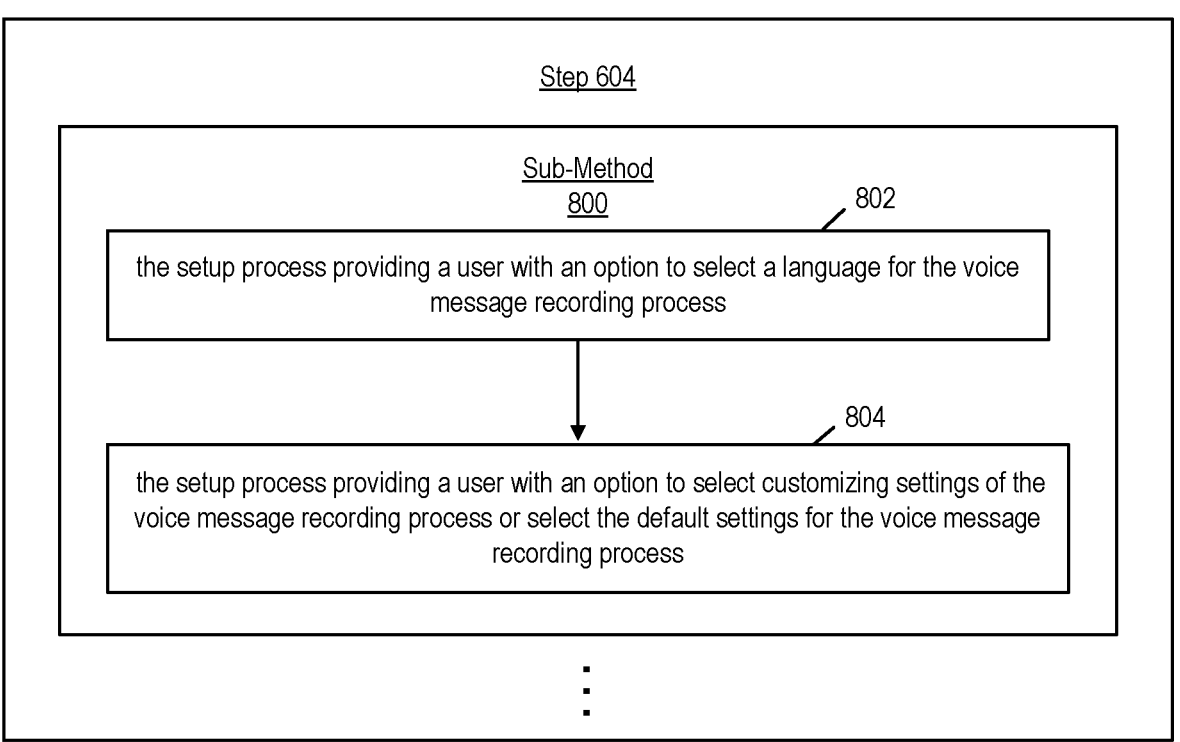

In some embodiments, the voice recording machine or the computing system provides user-selectable options in the user-interactive setup process that allow for customization, as shown by the method depicted in FIG. 8. The method 800 is a computer-implemented sub-method of step 604 of method 600 and, at step 802, commences with the user-interactive setup process providing a user with an option to with the telephone line cable for the voice message recording process prior to providing the option to select customizing settings or select the default settings. At step 804, the method 800 continues with the user-interactive setup process providing a user with an option to select customizing settings of the voice message recording process or select the default settings for the voice message recording process. In some embodiments, the user-interactive setup process includes receiving user input for the user-interactive setup process via a user interface of the telephone, and the user input is communicated to the computing device of the voice recording machine with the telephone line cable.

Figure 9:
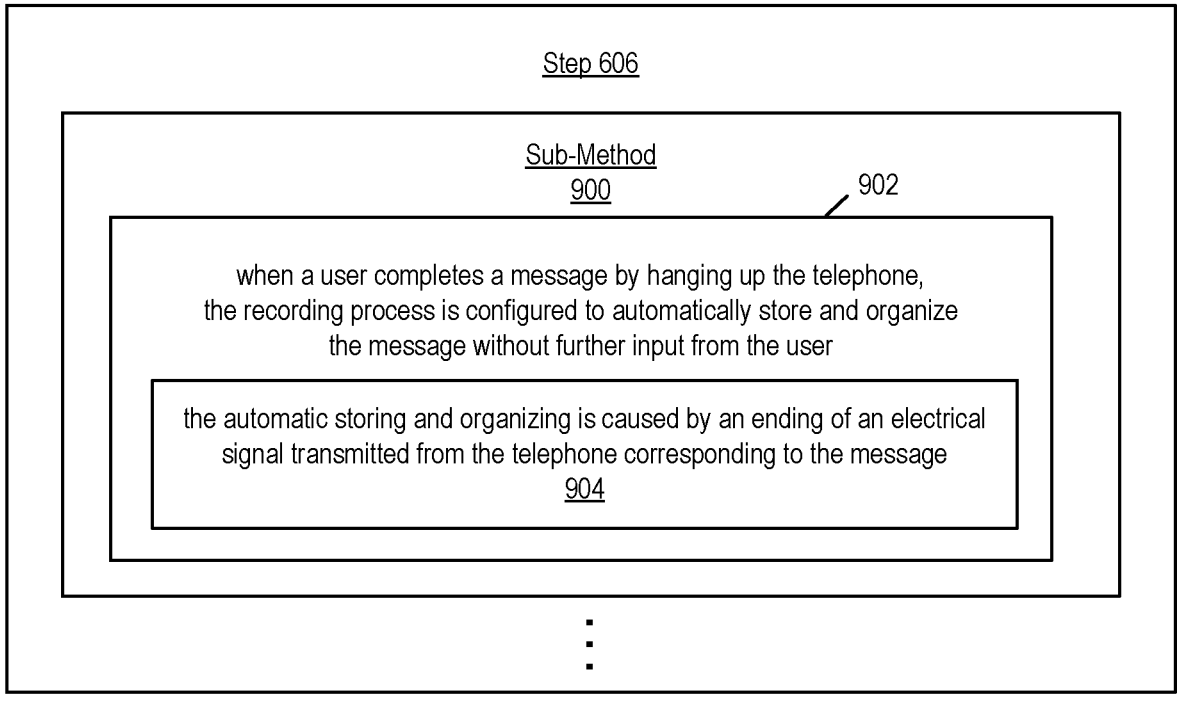

In some embodiments, the recording process is configured to automatically store and organize the message without further input from the user, as shown by the method depicted in FIG. 9. The method 900 is a computer-implemented sub-method of step 606 of method 600 and, at step 902, commences with the recording process automatically storing and organizing the message without further input from the user when a user completes a message by hanging up the telephone. At step 904, the method 900 includes the automatic storing and organizing caused by an ending of an electrical signal transmitted from the telephone corresponding to the message. In some embodiments, the user-interactive setup process includes receiving user input for the setup process via a user interface of the telephone, and the user input is communicated to the computing device of the voice recording machine with the telephone line cable.

Figure 10:
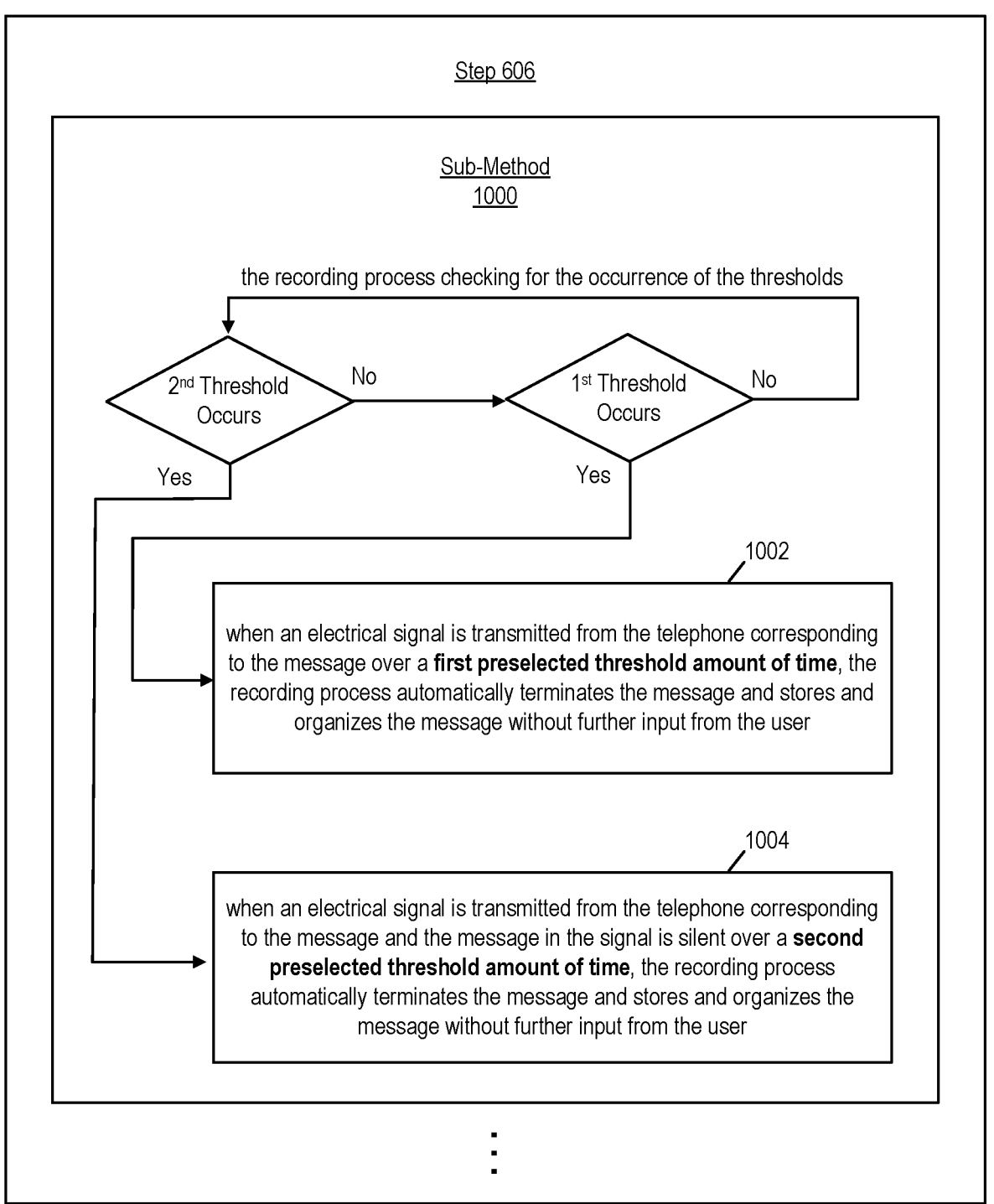

In some embodiments, the recording process is configured to automatically store and organize the message without further input from the user, as shown by the method depicted in FIG. 10. The method 1000 is a computer-implemented sub-method of step 606 of method 600 and, at step 1002, includes, when an electrical signal is transmitted from the telephone corresponding to the message over a first prese-lected threshold amount of time, the recording process automatically terminates the message and stores and orga-nizes the message without further input from the user. At step 1004, the method 1000 includes, when an electrical signal is transmitted from the telephone corresponding to the message and the message in the signal is silent over a second preselected threshold amount of time, the recording process automatically terminates the message and stores and orga-nizes the message without further input from the user. The first and second thresholds are different amounts of time, and as shown in FIG. 10, the second threshold amount of time occurs within or before the first threshold amount of time. And, as shown, the recording process continually checks for the occurrence of the thresholds.

Figure 11:
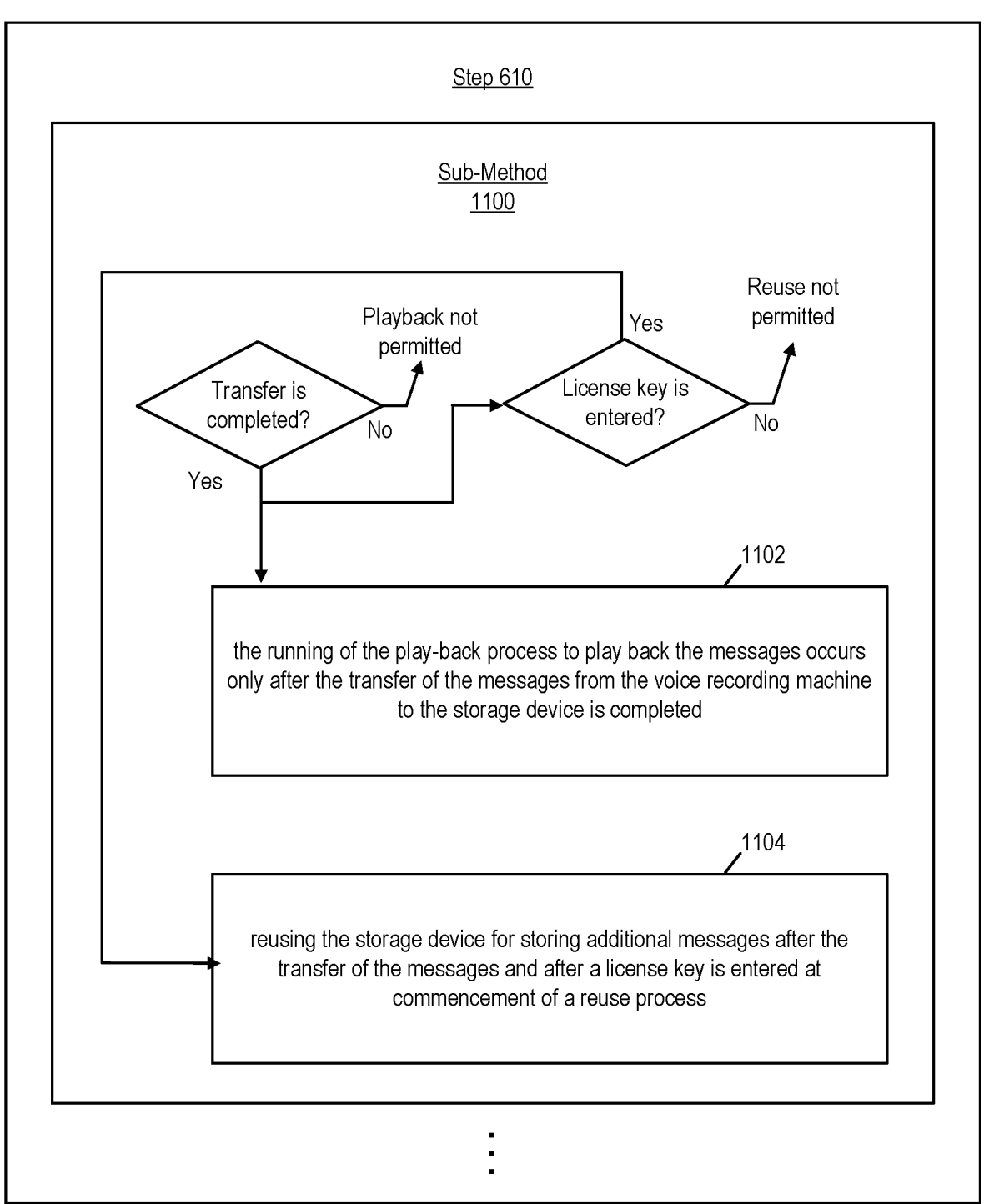

In some embodiments, the running of the play-back process to play back the messages occurs only after the transfer of the messages from the voice recording machine to the storage device is completed, as shown by the method 1100 of FIG. 11—which is a computer-implemented sub-method of step 610 of method 600. At step 1102 of the method, the running of the play-back process to play back the messages occurs, but only after the transfer of the messages from the voice recording machine to the storage device is completed. The storage device is not reusable for storing additional messages after the transfer of the mes-sages unless a license key is entered at the commencement of a reuse process. At step 1104 of the method 1100, the method continues with reusing the storage device for storing additional messages after the transfer of the messages and after a license key is entered at the commencement of a reuse process.

In some embodiments of step 610 or method 1100, the processor of the system or the computer implementing the method plays the messages and communicates the messages via the telephone. And, in some cases, the playing of the messages occurs in the order they were recorded, in a randomized order, or an order derived from contents of the messages depending on the order selected by a user, or a combination thereof depending on the embodiment or a selection of the user during the playback process.

In some embodiments, the user-interactive setup process can include user-selectable options for generating a configu-ration of a voice message recording process specific to a wedding, an anniversary party, a baby shower, a birthday, a graduation, a retirement party, a corporate or organizational event or party, or another type of event and milestone, or any combination thereof.

In some embodiments, during the recording process, end-users or guests can leave voicemails (such as via a vintage telephone), and those voicemails can then be recorded for being transformed into a keepsake for the host of the corresponding event. The keepsake can be digital (such as an online keepsake) or a physical keepsake such as a memory stick or an ornamental unit that can be displayed for viewing. The storage device that stores the messages can be used for one event or re-used with the re-activation of it via an additional license key.

Some portions of the preceding detailed descriptions have been presented in terms of algorithms and symbolic repre-sentations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. The present disclosure can refer to the action and processes of a computing system, or similar electronic computing device, which manipulates and transforms data represented as physical (electronic) quantities within the computing system's registers and memories into other data similarly represented as physical quantities within the com-puting system memories or registers or other such informa-tion storage systems.

While the invention has been described in conjunction with the specific embodiments described herein, it is evident that many alternatives, combinations, modifications, and variations are apparent to those skilled in the art. Accord-ingly, the example embodiments of the invention, as set forth herein are intended to be illustrative only, and not in a limiting sense. Various changes can be made without depart-ing from the spirit and scope of the invention.

What is claimed is:

1. A system, comprising:

a storage device configured to provide storage of digital information for an event; and a voice recording machine, comprising:

a storage device connector, configured to couple with the storage device to communicatively couple the storage device and the voice recording machine; and a computing device, comprising a processor and a non-transitory computer-readable storage medium compris-ing computer program code tangibly stored thereon, the computer program code comprising instructions executable by the processor to:

run a startup process for the voice recording machine;

run a user-interactive setup process to generate a configu-ration of a voice message recording process;

activate and run the voice message recording process to prompt, capture, store, and organize audio messages communicated to the voice message process from the according to the configuration of the voice message recording process, wherein when the configuration is not generated before the activation and running of the voice message recording process, the computing device will use a default configuration comprising default settings for the voice message recording process; and transfer the recorded and organized messages from the voice recording machine to the storage device after a user has selected to end the voice message recording process which includes an indication of the ending of the event, wherein the storage device is not reusable for storing additional messages after the transfer of the messages unless a license key is entered at the commencement of a reuse process, and wherein the computer program code comprises further instructions executable by the processor to play the messages and communicate the played messages after the transfer of the messages.

2. The system of claim 1, wherein the storage device comprises an external storage device that comprises a memory card or stick configured to store the digital information, and wherein the memory card or stick comprises an electronic non-volatile computer memory storage medium that is electrically erasable and reprogrammable.

3. The system of claim 2, wherein the electronic non-volatile computer memory storage medium comprises flash memory.

4. The system of claim 1, wherein the storage device comprises an external storage device that comprises a USB flash drive, wherein the USB flash drive is configured to store digital information and comprises flash memory and a USB interface integrated with the flash memory.

5. The system of claim 1, wherein the voice recording machine further comprises one or more lights on the voice recording machine, wherein the startup process activates and controls the one or more lights in a first way to indicate the startup process is occurring, wherein the startup process activates and controls the one or more lights in a second way to indicate the startup process is completed, and wherein when the recording process ends with the transferring of the recorded and organized messages to the storage device, the recording process activates and controls the one or more lights in a third way to indicate the transferring of the messages.

6. The system of claim 1, wherein the voice recording machine comprises a first electrical connector, configured to couple with an electrical connector of a telephone line cable to communicatively couple a telephone and the voice recording machine with the telephone line cable.

7. The system of claim 6, wherein the voice recording machine comprises a second electrical connector, configured to couple with a power cable to electrically couple an electrical power source and the voice recording machine with the power cable.

8. The system of claim 7, further comprising a rechargeable battery pack and wherein the electrical power source comprises the rechargeable battery pack.

9. The system of claim 6, further comprising the telephone and the telephone line cable.

10. The system of claim 6, wherein the user-interactive setup process provides a user with an option to select customizing settings of the voice message recording process or select the default settings for the voice message recording process, wherein the user-interactive setup process provides a user with an option to select a language for the voice message recording process prior to providing the option to select customizing settings or select the default settings, wherein the user-interactive setup process comprises receiving user input for the user-interactive setup process via a user interface of the telephone, and wherein the user input is communicated to the computing device of the voice recording machine with the telephone line cable.

11. The system of claim 6, wherein when a user completes a message by hanging up the telephone, the recording process is configured to automatically store and organize the message without further input from the user.

12. The system of claim 11, wherein the automatic storing and organizing is caused by an ending of an electrical signal transmitted from the telephone corresponding to the message.

13. The system of claim 6, wherein when an electrical signal is transmitted from the telephone corresponding to the message over a preselected threshold amount of time, the recording process is configured to automatically terminate the message and store and organize the message without further input from the user.

14. The system of claim 13, wherein the preselected threshold is a first threshold amount of time, wherein when an electrical signal is transmitted from the telephone corresponding to the message and the message in the signal is silent over a second preselected threshold amount of time, the recording process is configured to automatically terminate the message and store and organize the message without further input from the user, and wherein the first and second thresholds are different amounts of time.

15. The system of claim 6, wherein when an electrical signal is transmitted from the telephone corresponding to the message and the message in the signal is silent over a pre-selected threshold amount of time, the recording process is configured to automatically terminate the message and store and organize the message without further input from the user.

16. The system of claim 15, wherein the recording process comprises communicating a confirmation of completion via the telephone when the transferring of the recorded and organized messages to the storage device has been completed.

17. The system of claim 6, wherein the computer program code comprises further instructions executable by the processor to play the messages and communicate the played messages via the telephone, and wherein playing of the messages occurs in an order they were recorded, in a randomized order, or an order derived from the contents of the messages depending on the order selected by a user.

18. A system, comprising:

a storage device configured to provide storage of digital information for an event; and a voice recording machine, comprising:

a wireless communications interface, configured to couple with a wireless communications interface of a telephone to communicatively couple the telephone and the voice recording machine;

an electrical connector, configured to couple with a power cable to electrically couple an electrical power source and the voice recording machine with the power cable;

a storage device connector, configured to couple with the storage device to communicatively couple the storage device and the voice recording machine; and a computing device, comprising a processor and a non-transitory computer-readable storage medium comprising computer program code tangibly stored thereon, the computer program code comprising instructions executable by the processor to:

run a startup process for the voice recording machine;

run a user-interactive setup process to generate a configuration of a voice message recording process;

activate and run the voice message recording process to prompt, capture, store, and organize audio messages communicated to the voice message process from the telephone according to the configuration of the voice message recording process, wherein when the configuration is not generated before the activation and running of the voice message recording process, the computing device will use a default configuration comprising default settings for the voice message recording process; and transfer the recorded and organized messages from the voice recording machine to the storage device after a user has selected to end the voice message recording process which includes an indication of the ending of the event.

19. A system, comprising:

a storage device configured to provide storage of digital information for an event; and a voice recording machine, comprising:

a first electrical circuit, configured to integrate the voice recording machine with a telephone;

a second electrical circuit, configured to couple with a power cable to electrically couple an electrical power source and the voice recording machine or the telephone with the power cable;

a storage device circuit, configured to couple with the storage device to communicatively couple the storage device and the voice recording machine; and a computing device, comprising a processor and a non-transitory computer-readable storage medium comprising computer program code tangibly stored thereon, the computer program code comprising instructions executable by the processor to:

run a startup process for the voice recording machine;

run a user-interactive setup process to generate a configuration of a voice message recording process;

activate and run the voice message recording process to prompt, capture, store, and organize audio messages communicated to the voice message process from the telephone according to the configuration of the voice message recording process, wherein when the configuration is not generated before the activation and running of the voice message recording process, the computing device will use a default configuration comprising default settings for the voice message recording process; and transfer the recorded and organized messages from the voice recording machine to the storage device after a user has selected to end the voice message recording process which includes an indication of the ending of the event.

20. The system of claim 19, wherein the storage device is not reusable for storing additional messages after the transfer of the messages unless a license key is entered at the commencement of a reuse process, and wherein the computer program code comprises further instructions executable by the processor to play the messages and communicate the played messages via the telephone after the transfer of the messages.

\* \* \* \* \*